UNITED STATES PATENT OFFICE.

WILLIAM H. SMITH, OF MINNEAPOLIS, MINNESOTA.

PROCESS OF MAKING WOOD-STAIN.

1,024,531.　　Specification of Letters Patent.　　Patented Apr. 30, 1912.

No Drawing.　　Application filed February 14, 1910. Serial No. 543,869.

*To all whom it may concern:*

Be it known that I, WILLIAM H. SMITH, a citizen of the United States, residing at Minneapolis, in the county of Hennepin and State of Minnesota, have invented certain new and useful Improvements in Processes of Making Wood-Stain; and I do hereby declare the following to be a full, clear, and exact description of the invention, such as will enable others skilled in the art to which it appertains to make and use the same.

My invention has for its object to provide an improved shingle or wood stain for exterior use and an improved process for producing the same.

To the above ends, the invention consists of the novel combination of ingredients and steps of manipulation hereinafter described and defined in the claim.

The improved shingle stain, as hitherto made and used, is composed of creosote oil, gas drips, benzin, kerosene, boiled linseed oil, paint ground in oil and silica. The silica keeps the paint from settling after all the ingredients are commingled, but, in some instances, will be dispensed with.

The commercial product has been made in the following proportions, to-wit: 300 gallons #2 creosote oil, 100 gallons #2 gas drips, 20 gallons benzin, 20 gallons kerosene, 20 gallons boiled linseed oil, 550 pounds paint ground in oil and 146 pounds silica "F. S. C. A."; but the above proportions may be varied. The paint ground in oil is to give the desired color to the stain.

In the improved process of making the above described novel stain, the creosote oil, gas drips, benzin and kerosene are put in a tank and stirred until thoroughly mixed; are then let stand for about five days, and then all but the settlings are drawn off. Then the boiled linseed oil is added and the mixture is again stirred and thoroughly mixed. The paint may then be immediately added and stirred into the mixture, in which case the silica should be stirred therein at the same time to prevent settling, or the paint may be shipped with the ingredients of the stain minus the paint and the paint added at the place where it is intended for use, in which case the silica may be dispensed with; or otherwise stated, the silica should be added when the stain colored with the paint is not to be used for a considerable time after the ingredients have been mixed together.

What I claim is:

The process of making wood stain which consists first, in mixing together creosote oil, gas drips, benzin and kerosene, and allowing the same to stand and settle, then separating the settlings from the clear liquid and subsequently mixing therewith boiled linseed oil, paint ground in oil and silica.

In testimony whereof I affix my signature in presence of two witnesses:

WILLIAM H. SMITH.

Witnesses:
　HARRY D. KILGORE,
　ALICE V. SWANSON.